H. E. WIMPERIS.
ACCELEROMETER.
APPLICATION FILED AUG. 12, 1910.

982,336.   Patented Jan. 24, 1911.

Witnesses.
C. O. Franzoni.
C. F. Early.

Inventor.
H. E. Wimperis
By his Attorneys
Baldwin Wight

UNITED STATES PATENT OFFICE.

HARRY EGERTON WIMPERIS, OF CHELSEA, LONDON, ENGLAND, ASSIGNOR OF ONE-HALF TO GEORGE KEITH BULLER ELPHINSTONE, OF LONDON, ENGLAND.

ACCELEROMETER.

982,336.          Specification of Letters Patent.     Patented Jan. 24, 1911.

Application filed August 12, 1910. Serial No. 576,808.

*To all whom it may concern:*

Be it known that I, HARRY EGERTON WIMPERIS, a subject of the King of Great Britain, residing at 28 Rossetti Garden Mansions, Chelsea, London, England, have invented a new and useful Accelerometer, of which the following is a specification.

The primary object of this invention is to provide an improved instrument for measuring the acceleration or retardation of a vehicle, such as an automobile, a train, or a ship, but the instrument may be used for various other purposes, e. g. the determination of gradients, of the super-elevation of the curve of a railway line, of the angle of list or roll of a ship, of the power or efficiency of an engine, and so on.

The instrument consists essentially of a metallic mass delicately pivoted on its axis and having its center of gravity slightly removed from such axis. In order to check or damp the movements of the mass I place it in the field of a magnet which is preferably arranged so that a portion of the mass lies between the poles. The mass is conveniently formed in the shape of a disk or of a portion of a disk. An index is moved by the movements of the mass over a scale graduated according to the purpose for which the instrument is to be used, and a light spring or gravitational control is arranged to bring the mass back to a zero position.

In order that the movements of the mass may be unaffected by the tilting of its axis in a plane perpendicular to the direction in which the acceleration is to be measured, I pivot upon a parallel axis a second eccentric disk or mass, fast with which is a pinion meshing with a pinion fast with the first mass, the movements of the two masses about their respective axes being equal. I place a light spring control on one of the bodies and so arrange them that the two centers of gravity lie normally in the plane containing the two axes and either both between the axes or both outside them.

Figure 2:
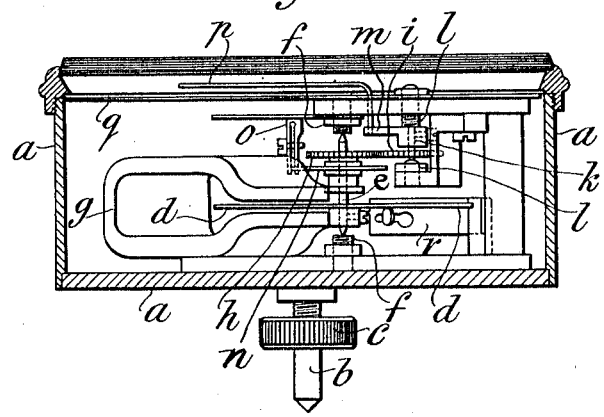
Figure 1:
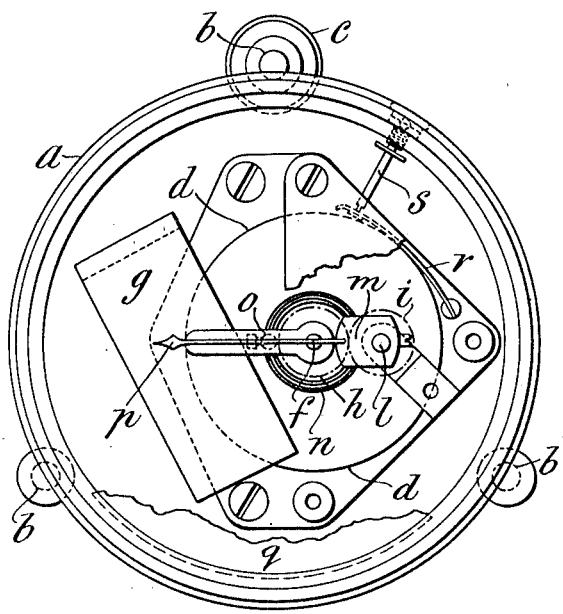

The accompanying drawings show an instrument made in accordance with this invention, Figure 1 being a plan and Fig. 2 a side elevation with the casing in section.

*a* is a casing standing on three feet *b*, one of which is provided with a screw and milled head *c* for leveling.

*d* is the mass or disk, preferably of copper, fast on an arbor *e* turning in fixed pivots *f* the center of gravity of the mass being eccentric to the pivots. Part of the disk lies between the poles of a magnet *g* which damps its movements.

Fast on the arbor *e* is a pinion *h* meshing with another pinion *i* fast on an arbor *k* turning in pivots *l* and carrying a mass *m* the center of gravity of which is eccentric to the pivots, the movements of the two masses about their respective axes being equal, while the centers of gravity normally lie in the plane through the axes of the arbors *e* and *k*. A light spring *n* attached to the arbor *e* and to a bracket *o* tends to bring the disk back to its zero position. The mass *m* carries an index *p* which moves over a graduated scale *q*.

*r* is a brake adapted to lock the disk when not in use and actuated by a spring rod *s*.

The result of having the moments of the two masses *d* and *m* equal about their respective axes is that forces in the plane containing these two axes do not affect the reading of the instrument.

When it is desired to use the instrument to measure the acceleration of an automobile, for instance, it should be placed on the vehicle with the plane through the axes of the arbors *e* and *k* at right angles to the direction of motion and the leveling screw should be adjusted until the needle comes to the zero of the scale. If the vehicle is subject to violent jolts it is well to check the accuracy of this adjustment from time to time during the run in order to make sure that the instrument has not been moved from its original position. Any acceleration due to the propelling force can then be seen from the movement of the needle.

Many applications of this instrument will occur to the engineer, for instance if the accelerometer register *n* feet per second when going uphill and the speed remain constant then the gradient will be $$\sin. \frac{-1n}{g}$$

or approximately 1 in $g/n$.

What I claim is:—

1. In an accelerometer, the combination of a pivoted mass having its center of gravity slightly removed from its pivot, a second pivoted mass also having its center of gravity slightly removed from its pivot, gearing connecting the two masses, an index actuated by the movements of the masses and a spring control adapted to bring the index back to a zero position.

2. In an accelerometer, the combination of a pivoted mass having its center of gravity slightly removed from its pivot, a second pivoted mass also having its center of gravity slightly removed from its pivot, gearing connecting the two masses, a magnet damping their movements, an index actuated by the movements of the masses and a spring control adapted to bring the index back to a zero position.

HARRY EGERTON WIMPERIS.

Witnesses:
    H. G. TISDALL,
    L. G. WATKINS.